US007314563B2

(12) United States Patent
Cho et al.

(10) Patent No.: US 7,314,563 B2
(45) Date of Patent: Jan. 1, 2008

(54) MEMBRANE COUPLED ACTIVATED SLUDGE METHOD AND APPARATUS OPERATING ANOXIC/ANAEROBIC PROCESS ALTERNATELY FOR REMOVAL OF NITROGEN AND PHOSPHOROUS

(75) Inventors: Jin Woo Cho, Seoul (KR); Kyu Hong Ahn, Seoul (KR); Kyung Guen Song, Seoul (KR); Kyung Min Poo, Busan (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 11/273,053

(22) Filed: Nov. 14, 2005

(65) Prior Publication Data

US 2007/0108125 A1    May 17, 2007

(51) Int. Cl.
*C02F 3/30* (2006.01)
*C02F 3/12* (2006.01)

(52) U.S. Cl. ............... 210/605; 210/614; 210/621; 210/630; 210/903; 210/906; 210/143; 210/220; 210/259

(58) Field of Classification Search .......... 210/605, 210/614, 620–622, 630, 903, 906, 143, 198.1, 210/220, 252, 259
See application file for complete search history.

(56) References Cited

U.S. PATENT DOCUMENTS

| 4,537,682 | A |   | 8/1985 | Wong-Chong |         |
|-----------|---|---|--------|------------|---------|
| 5,303,308 | A |   | 4/1994 | Larsen et al. |      |
| 5,482,630 | A | * | 1/1996 | Lee et al. | 210/605 |
| 5,624,565 | A |   | 4/1997 | Lefevre et al. |    |
| 5,733,456 | A |   | 3/1998 | Okey et al. |       |
| 5,989,428 | A | * | 11/1999 | Goronszy | 210/605 |
| 6,093,322 | A |   | 7/2000 | Bongards |         |
| 6,527,956 | B1|   | 3/2003 | Lefevre et al. |    |
| 6,609,070 | B1| * | 8/2003 | Lueck | 702/50 |
| 6,616,843 | B1| * | 9/2003 | Behmann et al. | 210/605 |

FOREIGN PATENT DOCUMENTS

| JP | 4-104896     | 4/1992 |
| JP | 06-055190    | 3/1994 |
| JP | HEI 7-100486 | 4/1995 |
| KR | 10-165169    | 1/1999 |
| KR | 2000-19567   | 4/2000 |

(Continued)

OTHER PUBLICATIONS

PCT International Search Report of PCT/KR2005/004590 by Korean Intellectual Property Office mailed on Jul. 26, 2006.

*Primary Examiner*—Fred G. Prince
(74) *Attorney, Agent, or Firm*—Knobbe Martens Olson & Bear LLP

(57) ABSTRACT

Disclosed are a membrane coupled activated sludge method and apparatus operating anoxic/anaerobic processes alternately for removal of nitrogen and phosporus, wherein nitrogen and phosphorous together with organics in the sewage, wastewater, filthy water etc. can be simultaneously removed with an economic and efficient manner, an operation thereof is easy and efficient, a capacity thereof is high and the method is economic due to the reduced operating costs with performing measurement and control of a recycle rate, a recycle time of alternate operation of the anoxic and anaerobic process, an amount of sludge, an amount of aeration and an operation of a blower for an intermittent membrane cleaning.

8 Claims, 3 Drawing Sheets

FOREIGN PATENT DOCUMENTS

| | | | |
|---|---|---|---|
| KR | 2001-88714 | | 9/2001 |
| KR | 2002-44820 | | 6/2002 |
| KR | 2002-090967 | * | 12/2002 |
| KR | 2002-90967 | | 12/2002 |
| KR | 2004-020325 | * | 3/2004 |

* cited by examiner

MEMBRANE COUPLED ACTIVATED SLUDGE METHOD AND APPARATUS OPERATING ANOXIC/ANAEROBIC PROCESS ALTERNATELY FOR REMOVAL OF NITROGEN AND PHOSPHOROUS

BACKGROUND OF THE INVENTION

1. Field of the Invention

The present invention relates to a membrane coupled activated sludge method and apparatus operating anoxic/anaerobic processes alternately for removal of nitrogen and phosphorous. In particular, the invention relates to a method for treating sewage, wastewater, filthy water, etc. wherein nitrogen and phosphorous together with organics in the sewage, wastewater, filthy water, etc., can be simultaneously removed with economic and efficient manners using a membrane coupled activated sludge apparatus comprising an anoxic/anaerobic alternating-type reactor with an intermittent internal recycle at a time interval and an aerobic reactor having a separation membrane of a submerged-type and operating continuously, and more particularly to a method for treating sewage, wastewater, filthy water, etc. for simultaneous removal of nitrogen and phosphorous wherein an operation thereof is easy and efficient, a capacity thereof is high and the method is economic due to the reduced operating costs with performing measurement and control of a recycle rate, a recycle time of alternate operation of the anoxic and anaerobic process, an amount of sludge, an amount of aeration and an operation of a blower for an intermittent membrane cleaning.

2. Background of the Related Art

When nitrogen and phosphorous contained in a sewage, wastewater, filthy water, etc. are discharged without any treatment, they may cause eutrophication in rivers and lakes and thus exerts bad influences on water resource and water ecosystem. Especially, when an infant drinks water containing a large quantity of nitrate nitrogen, cyanosis can be caused, so that a measure for this is required.

Accordingly, in order to treat nitrogen and phosphorous of which regulations are being intensified, various advanced treatments have been suggested. As representative treatments, there have been biological advanced treatments such as MLE (Modified Ludzack-Ettinger), UCT (University of Cape Town), MUCT (Modified University of Cape Town), VIP (Virginia Initiative Plant) and the like.

However, the above treatments have a disadvantage of very complex operation since the treatments usually use a plurality of reactors and internal circulation pumps and it is difficult to maintain optimal conditions for removing nitrogen and phosphorous according to the treatments. Further, the above treatments have a problem that it is hard to maintain a concentration of microbes to be high since a solid-liquid separation between microbes and treated water is carried out by gravity sedimentation in a settling tank. In addition, according to the above treatments, since a bulking phenomenon of microbes occurs by shock loads such as change of inflow load and inflow of toxic substances, the quality of the treated water is poor and an efficient treatment is difficult due to a loss of activated microbes. Further, the treatments require large sites since it is necessary to equip at least two independent reactors and a terminal settling tank according to the treatments, so that they are not suitable for small and medium sized sewage/wastewater advanced treatment.

In order to solve the above problems, various sewage/wastewater advanced treatment methods using a separation membrane in solid-liquid separation have been attempted. However, in this case, a plurality of reactor should be also arranged for such advanced treatments and the removal of nitrogen is difficult.

As one of the prior treatment methods, there is known a "drainage treating method." According to this method, a first treatment tank inducing nitrification and denitrification through an intermittent aeration and a second treatment tank having a submerged-type separation membrane for solid-liquid separation are provided to remove nitrogen and to carry out a continuous suction filtration (Japanese Patent Publication No. Hei 7-100486). However, this method cannot remove phosphorous efficiently since an anaerobic condition for removing nitrogen cannot be made. In addition, since the second treatment tank is separately provided to carry out the continuous suction filtration, an additional aeration for the second treatment tank is required to prevent the separation membrane from being contaminated. As a result of that, energy costs for the aeration are needed twice.

As another example of the prior art, there is known "apparatus and method for biologically removing nitrogen and phosphorous using submerged-type separation membrane." According to this method, anoxic, anaerobic, aerobic and deaeration tanks are sequentially installed to induce simultaneous removal of nitrogen and phosphorous (Korean Patent Publication No. 2002-44820). However, in this case, the anaerobic tank also should be additionally provided to remove phosphorous. In addition, when treating sewage having a small C/N ratio, most of carbon sources are used to remove nitrogen in the anoxic tank installed at the front end, so that the carbon sources required for phosphorous release are deficient in the anaerobic tank and thus the method has a limitation in the phosphorous removal.

Accordingly, needed is a sewage/wastewater advanced treatment method having a structure simplified by reducing the number of the reactors and required pumps and capable of carrying out a continuous treatment while treating nitrogen and phosphorous simultaneously and improving a quality of treated water.

Meanwhile, in recent years, as a computer technology develops and a reliable measuring instrument appears, researches on diagnosing sewage/wastewater treating procedures and performing a process control are being carried out by monitoring a sewage/wastewater dump and using data obtained from the monitoring.

It is called a measurement and control that quantitative and qualitative data of a process are perceived with a measuring equipment so as to monitor a process situation and an instrument or apparatus is made to operate under optimal situations using the data.

One example of the measurement and control is a blower operation of attaching a timer and setting operation and non-operation times of the blower in a continuous batch reactor.

In addition, known are methods of performing a real time measurement. For instance, there have been developed control methods of using absolute values or variations according to time of oxidation-reduction potential (ORP), hydrogen ion concentration (pH) and dissolved oxygen (DO) (U.S. Pat. Nos. 5,303,308A, 5,624,565 A, 6,093,322A and 6,527,956B1 and JP 1994-055190).

Further, in a case of a continuous reactor, known are methods of measuring DO to control an air amount supplied to an aerobic tank (U.S. Pat. No. 4,537,682A). Also, it is reported a method of calculating a difference of ORP values between those of inflow water and an anoxic tank to control a recycle rate (U.S. Pat. No. 5,733,456A).

However, since the above measurement and control methods according to the prior art have been developed to be suitable for the corresponding sewage/wastewater treating methods, it is needed to develop a new measurement and control process as well as a new sewage/wastewater advanced treatment process.

SUMMARY OF THE INVENTION

Accordingly, the present invention has been made to solve the above problems of the prior art. An object of the present invention is to provide a membrane coupled activated sludge method and apparatus operating anoxic/anaerobic processes alternately for removal of nitrogen and phosphorous, wherein the anoxic/anaerobic processes are alternately repeated with an intermittent operation of an internal circulation pump to remove the nitrogen under anoxic condition and to release the phosphorous under anaerobic condition, thereby processing the nitrogen and phosphorous simultaneously in the sewage, wastewater, filthy water, etc. and improving the quality of the treated water, and wherein the process is simple and can be continuously performed by reducing the number of required reactor and pumps.

Another object of the invention is to provide a membrane coupled activated sludge method and apparatus operating anoxic/anaerobic processes alternately for removal of nitrogen and phosphorous, wherein the method and apparatus further comprise a measurement and control suitable for the method and apparatus, so that an operation thereof is easy, and it is possible to maximize treatment efficiency and capacity and to reduce operating costs.

In order to achieve the above object, there is provided a membrane coupled activated sludge method operating anoxic/anaerobic processes alternately for removal of nitrogen and phosphorous being a method for advanced treating of sewage, wastewater, filthy water, etc. simultaneously treating nitrogen and phosphorous wherein an anoxic process, in which a denitrification reaction for removing nitrogen occurs, and an anaerobic process for phosphorous release are alternately carried out, the anoxic process comprising steps of: (a) continuously flowing sewage, filthy water or wastewater as an inflow water into an anoxic/anaerobic alternating-type reactor; (b) operating an internal recycle pump intermittently to internally recycle nitrate nitrogen occurring in an aerobic reactor continuously and thus to make the anoxic/anaerobic alternating-type reactor into anoxic condition; (c) converting and removing the nitrate nitrogen supplied through the internal recycle of the step (b) into nitrogen gas by using organics in the continuous inflow water as carbon source; (d) overflowing and moving the mixed solution denitrified in the step (c) into a continued aerobic reactor; (e) carrying out a nitrification process of converting organic nitrogen and ammonia nitrogen, which are supplied from the inflow water, into nitrate nitrogen with nitrification microbes and an organic oxidation process of decomposing remaining organics, under aerobic condition of the aerobic reactor in which continuous aeration is made by a blower; and (f) continuously discharging treated water by using a submerged-type separation membrane equipped in the aerobic reactor; the anaerobic process comprising steps of: (a') continuously flowing sewage, filthy water or wastewater as an inflow water into the anoxic/anaerobic alternating-type reactor; (b') stopping the internal recycle pump, which is intermittently operated, to discontinue the internal recycle of the nitrate nitrogen occurring in the aerobic reactor and thus to make the anoxic/anaerobic alternating-type reactor into anaerobic condition; (c') releasing phosphorous with microbes for removing phosphorous by using organics of the continuous inflow water as carbon source, under anaerobic state that the nitrate nitrogen is denitrified and depleted due to the interruption of the internal recycle in the step (b'); (d') overflowing and moving the microbes having released the phosphorous in the step (c') into the continued aerobic reactor; (e') lowering a concentration of dissolved phosphorous in the aerobic reactor through a phosphorous excessive uptake of the phosphorous releasing microbes in the step (d') and simultaneously carrying out the nitrification process of converting organic nitrogen and ammonia nitrogen, which are supplied from the inflow water, into nitrate nitrogen by nitrification microbes and the organic oxidation process of decomposing remaining organics, under aerobic condition of the aerobic reactor in which continuous aeration is made by the blower; (f') continuously discharging treated water of which phosphorous is removed by using the submerged-type separation membrane equipped in the aerobic reactor; and (g') wasting sludge, in which phosphorous is excessively ingested in the step (e'), to release the phosphorous; and wherein the anoxic and anaerobic processes in the anoxic/anaerobic alternating-type reactor are distinguished according to whether the internal recycle of the nitrate nitrogen with the internal recycle pump is performed.

According to the invention, the membrane coupled activated sludge method operating anoxic/anaerobic processes alternately for removal of nitrogen and phosphorous may further comprise a recycle rate control step (S1) of maintaining a ratio of an internal recycle flow rate of the nitrate nitrogen to an inflow rate of the inflow water to be constant; a recycle time control step (S2) of continuously measuring an oxidation-reduction potential (ORP) in the anoxic/anaerobic alternating-type reactor and determining whether the internal recycle pump is operated or not, based on the measured value; a blower control step (S3) of continuously measuring dissolved oxygen (DO) in the aerobic reactor if the internal recycle pump is operated and regulating a rotating speed of the blower so as to maintain the dissolved oxygen (DO) value to be a predetermined level; and a sludge waste amount control step (S4) of determining a sludge waste amount according to a following equation 1 and wasting the sludge.

$$FR = \frac{\left( \begin{array}{c} S_{anoxic/anaerobic\ alternating\text{-}type\ reactor} \times \\ V_{anoxic/anaerobic\ alternating\text{-}type\ reactor} \end{array} \right) + }{S_{aerobic\ reactor} \times SRT_d} \quad \text{?equation 1?}$$

Herein, FR represents sludge waste amount (m³/day), $S_{anoxic/anaerobic\ alternating\text{-}type\ reactor}$ represents sludge concentration in the anoxic/anaerobic alternating-type reactor (kg/m³), $S_{aerobic\ reactor}$ represents sludge concentration in the aerobic reactor (kg/m³), $V_{anoxic/anaerobic\ alternating\text{-}type\ reactor}$ represents a volume of the anoxic/anaerobic alternating-type reactor (m³), $V_{aerobic\ reactor}$ represents a volume of the aerobic reactor (m³), and $SRT_d$ represents a set average SRT (Solids Retention Time)(day).

According to the invention, in the step S1, the ratio of an internal recycle flow rate of the nitrate nitrogen to an inflow rate of the inflow water may be controlled through a proportional controller.

According to the invention, in the step S2, under state that the internal recycle pump is being operated, the oxidation-reduction potential (ORP) value in the anoxic/anaerobic alternating-type reactor may be continuously measured to operate the internal recycle pump continuously when the oxidation-reduction potential (ORP) value is −100 mV or less and to stop the operation of the internal recycle pump when the oxidation-reduction potential (ORP) value is more than −100 mV, and under state that the internal recycle pump is not operated, the oxidation-reduction potential (ORP) value in the anoxic/anaerobic alternating-type reactor may be continuously measured to operate the internal recycle pump when the oxidation-reduction potential (ORP) value is less than −400 mV.

According to the invention, in the step S3, when the internal recycle pump is not operated, the rotating speed of the blower may be maximized to clean the membrane for a predetermined time.

According to the invention, in the step S3, under state that the internal recycle pump is operated, the rotating speed of the blower may be regulated so that the dissolved oxygen (DO) in the aerobic reactor is not to be less than 2.0 mg/l, and under state that the internal recycle pump is not operated, the operation interruption time of the internal recycle pump may be measured and then the rotating speed of the blower may be maximized to clean the membrane when the operation interruption time is more than 1 minute and less than 10 minutes.

According to the invention, in the step S4, the $SRT_d$ of the equation 1 may be set to be 40 to 60 days when determining the sludge waste amount.

In order to achieve the above object, there is also provided a membrane coupled activated sludge apparatus operating anoxic/anaerobic processes alternately for removal of nitrogen and phosphorous being an apparatus for advanced treating of sewage, wastewater, filthy water, etc. simultaneous treating nitrogen and phosphorous wherein an anoxic process, in which a denitrification reaction for removing nitrogen occurs, and an anaerobic process for releasing phosphorous are alternately carried out, the apparatus comprising an anoxic/anaerobic alternating-type reactor having an agitator and into which inflow water of sewage, filthy water or wastewater is continuously flown; an aerobic reactor having a blower and allowing an organic oxidation reaction, a nitrification reaction and an excessive uptake of phosphorous to occur under an aerobic condition; an internal recycle pump recycling nitrate nitrogen occurring from the aerobic reactor to the anoxic/anaerobic alternating-type reactor; and a submerged-type separation membrane equipped in the aerobic reactor and discharging treated water continuously through membrane filtration, wherein the anoxic and anaerobic processes in the anoxic/anaerobic alternating-type reactor are distinguished according to whether the internal recycle of the nitrate nitrogen with the internal recycle pump is performed.

According to the invention, the apparatus may further comprise an oxidation-reduction potential (ORP) measuring sensor for measuring an oxidation-reduction potential (ORP) in the anoxic/anaerobic alternating-type reactor; a dissolved oxygen (DO) measuring sensor for measuring a dissolved oxygen (DO) in the aerobic reactor; an inflow flowmeter for measuring and controlling a flow rate of the inflow water; a recycle flowmeter for measuring and controlling an internal recycle flow rate; a surplus sludge flowmeter for measuring and controlling an amount of waste sludge discharged from the aerobic reactor; and a processor for controlling the internal recycle pump, the blower and each of the flowmeters, corresponding to the information of the measured values inputted from the sensors and flowmeters.

According to the invention, the processor may consist of a digital input/output computer and an analog/digital (A/D) converter converting a digital signal outputted into an analog signal for outputting the analog signal and converting the analog signal inputted into a digital signal for inputting the digital signal.

DETAILED DESCRIPTION OF THE PREFERRED EMBODIMENTS

Hereinafter, a membrane coupled activated sludge method and apparatus operating anoxic/anaerobic processes alternately for removal of nitrogen and phosphorous according to the invention will be described in detail with reference to the accompanying drawings.

Figure 1:
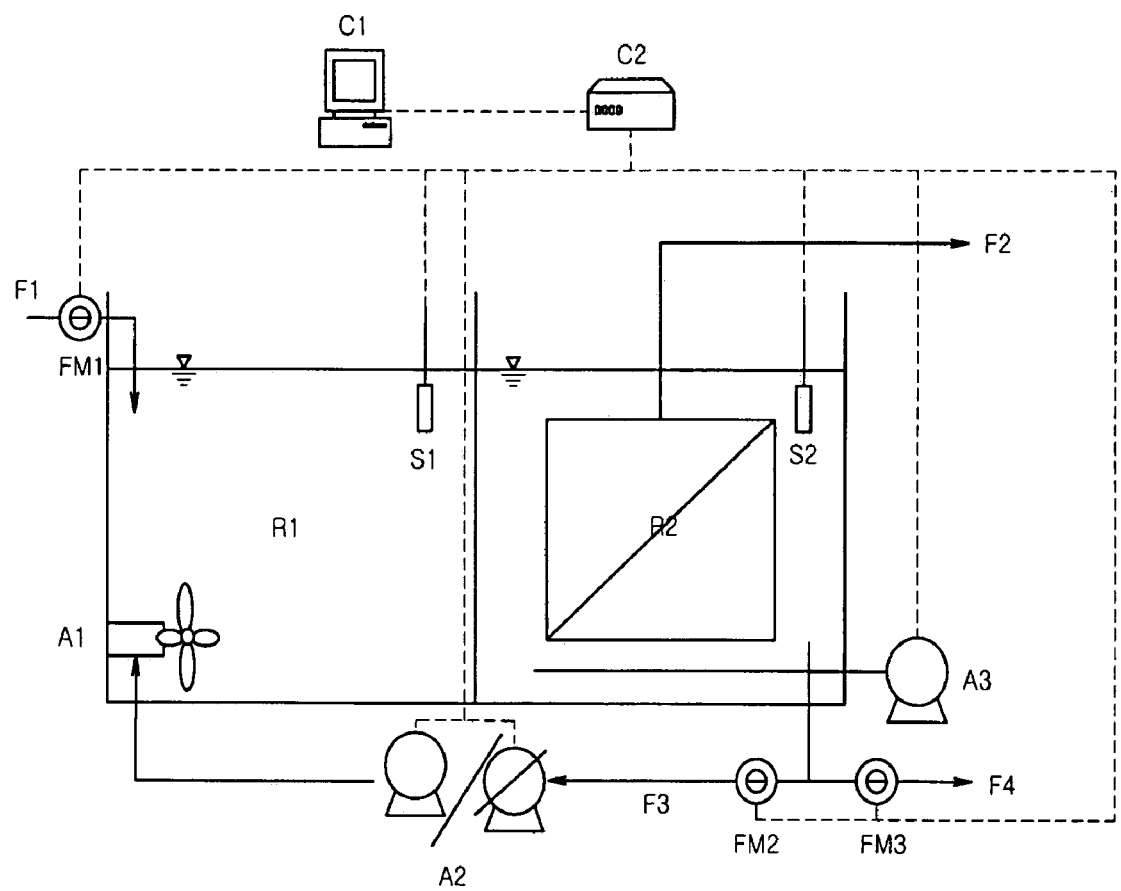
FIG. 1 is a schematic view showing a membrane coupled activated sludge apparatus operating anoxic/anaerobic processes alternately for removal of nitrogen and phosphorous according to the invention.

FIG. 1 is a schematic view showing a membrane coupled activated sludge apparatus operating anoxic/anaerobic processes alternately for removal of nitrogen and phosphorous according to the invention;

As shown in FIG. 1, the apparatus for embodying a membrane coupled activated sludge method operating anoxic/anaerobic processes alternately for simultaneous removal of nitrogen and phosphorous comprises a front anoxic/anaerobic alternating-type reactor R1 and a rear aerobic reactor R2 having a submerged-type membrane and allowing organic oxidation, nitrification reactions and an excessive uptake of phosphorous to occur under aerobic condition.

Further, as a driving device, the apparatus comprises an underwater agitator A1 agitating the anoxic/anaerobic alternating-type reactor, an internal recycle pump A2 intermittently recycling nitrate nitrogen from the aerobic reactor R2 to the anoxic/anaerobic alternating-type reactor R1 at a predetermined time interval and capable of being controlled in an ON/OFF manner, and a blower A3 aerating the aerobic reactor R2 and having a controllable rotating speed.

In addition, according to the invention, the apparatus comprises a following measurement and control device so as to measure and control the reactors R1, R2 and the driving devices A1, A2, A3.

As a measuring device, an oxidation-reduction potential (ORP) measuring sensor S1 for measuring an oxidation-reduction potential (ORP) in the anoxic/anaerobic alternating-type reactor R1 is equipped in the anoxic/anaerobic alternating-type reactor R1. A dissolved oxygen (DO) measuring sensor S2 for measuring a dissolved oxygen (DO) in the aerobic reactor R2 is equipped in the aerobic reactor R2.

As a measuring and controlling device, an inflow flowmeter FM1 capable of measuring and controlling an inflow rate of the inflow water is provided to one side of a flow path of the inflow water, a recycle flowmeter FM2 capable of measuring and controlling an internal recycle flow rate of the nitrate nitrogen is provided to one side of a recycle path, and a surplus sludge flowmeter FM3 capable of measuring and controlling a sludge waste amount is provided to one side of a surplus sludge waste path.

A personal computer (PC), which is a processor, is used as a based control system electrically connected to the measuring devices S1, S2 or measuring and controlling devices FM1, FM2, FM3, internal recycle pump A2 and blower A3 in a wired or wireless manner. Herein, the PC is used together with an analog/digital (A/D) converter.

That is, the PC C1, which is a system control device, monitors and stores data collected from each of the measuring devices S1, S2 (or measuring and controlling devices FM1, FM2, FM3) through MMI (Man Machine Interface) and transmits an output signal required according to each of control algorithms. A digital value outputted is transmitted to corresponding driving machines. A2, A3 (or measuring and controlling devices FM1, FM2, FM3) as an analog value via the digital/analog converter C2. On the other hand, the analog value transmitted from each of the measuring devices S1, S2 (or measuring and controlling devices FM1, FM2, FM3) is converted into a digital value via the digital/analog converter C2 and inputted into the PC C1. The above procedures are repeated.

A membrane coupled activated sludge method operating anoxic/anaerobic processes alternately for removal of nitrogen and phosphorous according to the invention using the above apparatus is as follows.

At First, inflow water such as sewage, filthy water, wastewater and the like is continuously flown into the anoxic/anaerobic alternating-type reactor R1.

An anoxic process and an anaerobic process in the anoxic/anaerobic alternating-type reactor R1 are distinguished according to the performing of the internal recycle. That is, since nitrate nitrogen is continuously supplied when the internal recycle pump A2, which is intermittently operated at a time interval, is operated and there is thus a recycle flow F3, there comes to be the anoxic process in the anoxic/anaerobic alternating-type reactor R1. On the other hand, during an interruption period of the recycle flow F3, since the supply of nitrate nitrogen is interrupted and thus nitrate nitrogen in the reactor R1 is depleted, there comes to be the anaerobic process in the anoxic/anaerobic alternating-type reactor R1.

During the anoxic process, in the anoxic/anaerobic alternating-type reactor R1, progressed is a denitrification process that converts nitrate nitrogen, which is supplied by the internal recycle from the aerobic reactor R2, into nitrogen gas using organics in the continuous inflow water F1 as carbon source. The mixed solution denitrified overflows and moves into the continued aerobic reactor R2.

During the anaerobic process, the internal recycle into the anoxic/anaerobic alternating-type reactor R1 is stopped. To this end, nitrate nitrogen remaining in the anoxic/anaerobic alternating-type reactor R1 is denitrified and completely removed and so, an anaerobic condition is made. Then, phosphorous removal microbes release the phosphorous using the carbon source contained in the inflow water F1. In the continued aerobic reactor R2, the microbes that released the phosphorous reduces a concentration of dissolved phosphorous in the aerobic reactor R2 through an excessive uptake of phosphorous and at the same time a nitrification process of converting organic nitrogen and ammonia nitrogen supplied from the inflow water F1 into nitrate nitrogen by nitrification microbes and an organic oxidation process of decomposing the organics remained are progressed. The treated water F2 of which the phosphorous is removed as stated above is continuously discharged using the submerged-type separation membrane equipped in the aerobic reactor R2.

The submerged-type separation membrane is preferably a precision filtration membrane or ultrafiltration membrane having a shape selected from a flat membrane type, a hollow fiber type or a tubular type. It is preferred to use a suction pump or a natural suction pressure when performing membrane filtration, in order to obtain treated water from the submerged-type separation membrane.

The aerobic reactor R2 separates sludge and treated water through the membrane, contrary to the prior traditional activated sludge method using a secondary settling tank, and the sludge in the aerobic reactor R2 is recycled as it is. Herein, a concentration of the sludge is maintained to be very high and a high SRT can be maintained in the aerobic reactor R2, so that it is advantageous to nitrify. In operating, it is proper that the sludge concentration in the anoxic/anaerobic alternating-type reactor R1 is 8,000 mg/l and the sludge concentration in the aerobic reactor R2 is 10,000 mg/l. A surplus sludge F4 is continuously wasted in a small amount, so as to smoothly perform the phosphorous absorption in the aerobic reactor R2.

In addition to the membrane coupled activated sludge method operating anoxic/anaerobic processes alternately for removal of nitrogen and phosphorous as described above, as a measurement and control process, a recycle rate control (Step 1), a recycle time control (Step 2), a blower control (Step 3) and a sludge waste amount control (Step 4) are further carried out.

The recycle rate control (Step 1) is firstly described. Since a flow rate of the inflow water changes according to season and time, a recycle rate changes according to the season and time in the case that an internal recycle flow rate is set to be constant. The recycle rate affects a concentration of outflow nitrate nitrogen. When the recycle rate is low, the concentration of the outflow nitrate nitrogen becomes high, and when the recycle rate is high, a pump operating ratio is needed without an increase of the efficiency. Accordingly, in order to maintain the recycle rate to be optimal, each of the inflow rate and the recycle flow rate is controlled so that the recycle flow rate to the inflow rate becomes a certain ratio. In particular, it is preferred to control the recycle rate using a proportional controller (installed in the PC) in a proportional control manner.

Figure 2:
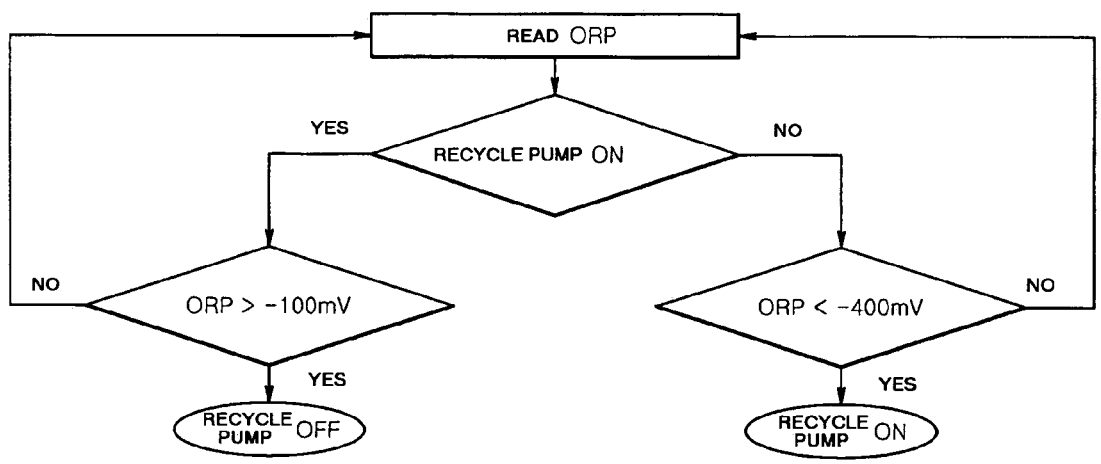
FIG. 2 is a flow chart showing measurement and control of an internal recycle pump in a membrane coupled activated sludge apparatus operating anoxic/anaerobic processes alternately for removal of nitrogen and phosphorous according to an embodiment of the invention.

Next, the recycle time control (Step 2) is described. FIG. 2 is a flow chart showing measurement and control of an internal recycle pump in a membrane coupled activated sludge apparatus operating anoxic/anaerobic processes alternately for removal of nitrogen and phosphorous according to an embodiment of the invention.

As shown in FIG. 2, the inflow water is continuously introduced into the anoxic/anaerobic alternating type-reactor and the value measured by the internal oxidation-reduction potential (ORP) sensor in the tank is continuously outputted to the PC. At this time, when the oxidation reduction potential (ORP) value measured under state that the internal recycle pump is being operated is −100 mV or less, the internal recycle pump continues to be operated, and when the oxidation reduction potential (ORP) value is more than −100 mV, the operation of the internal recycle pump is stopped. The higher the oxidation-reduction potential (ORP)

value, it means that the more is an amount of the oxidized substance. If the value is too high, it means that the concentrations of oxygen and nitrate nitrogen in the anoxic/anaerobic alternating type-reactor are increased due to the flow recycled from the aerobic reactor. Further, when the dissolved oxygen is high, the oxidation-reduction potential (ORP) value should be controlled not to exceed −100 mV because the organics in the inflow water is used to reduce the oxygen and thus the denitrification efficiency is decreased. On the other hand, when the recycle flow is stopped, an anaerobic condition is made. At this time, the reaction is continued until the oxidation-reduction potential (ORP) value is lowered to 400 mV so that the nitrate nitrogen is completely denitrified and a biological phosphorous release can occur sufficiently. When the oxidation-reduction potential (ORP) value is lowered below −400 mV, the recycle pump is again operated to convert the reactor into the anoxic condition.

Figure 3:
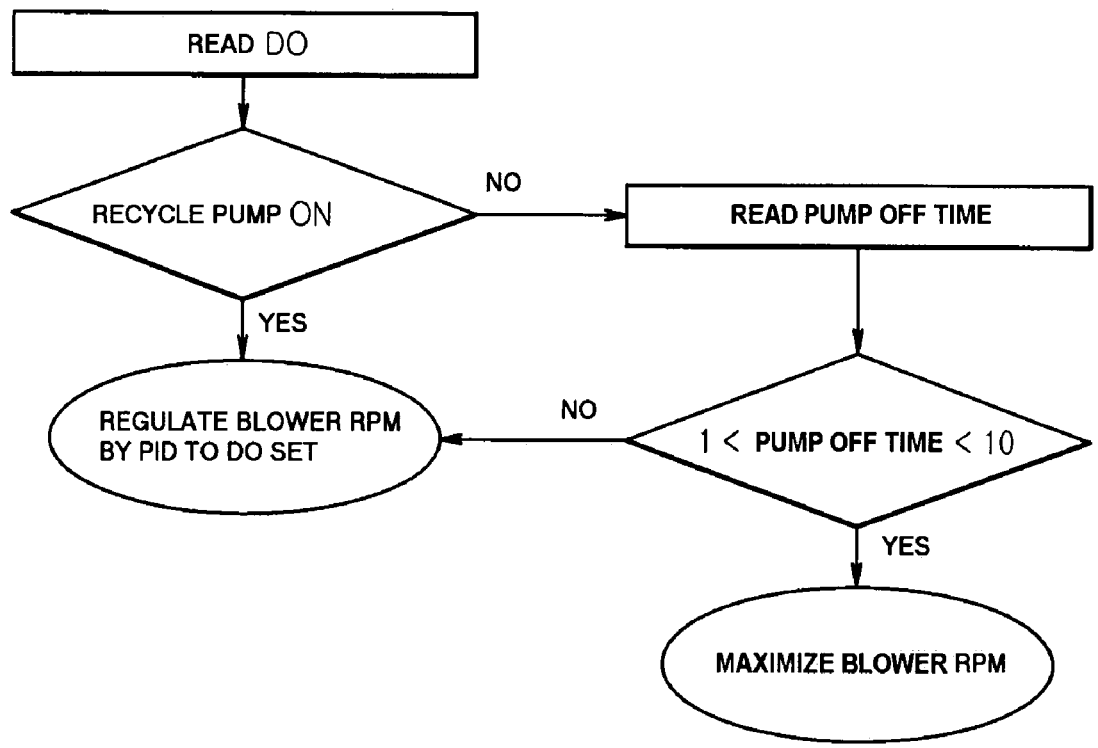
FIG. 3 is a flow chart showing measurement and control of a blower in a membrane coupled activated sludge apparatus operating anoxic/anaerobic processes alternately for removal of nitrogen and phosphorous according to the invention.

Next, the blower control (Step 3) is explained. FIG. 3 is a flow chart showing measurement and control of a blower in a membrane coupled activated sludge apparatus operating anoxic/anaerobic processes alternately for removal of nitrogen and phosphorous according to the invention.

It is required an oxidation reaction of ammonia nitrogen into nitrate nitrogen in the aerobic reactor. Herein, the necessary minimum dissolved oxygen (DO) is 0.5 mg/l and an optimum dissolved oxygen (DO) is 2.0 mg/l. Accordingly, based on the current dissolved oxygen (DO) value, a rotating speed of the blower is regulated with a PID (Proportional-Integrate-Derivative) controller (equipped in the PC) so that the dissolved oxygen (DO) in the aerobic reactor is not lowered below 2.0 mg/l. Since the dissolved oxygen (DO) concentration in the aerobic reactor affects the reaction in the anoxic/anaerobic alternating type-reactor within the operating range of the internal recycle pump, the dissolved oxygen (DO) is maintained to be 2.0 mg/l, which is an optimum value.

When the operation of the recycle pump is stopped, an operation interruption time is measured. When the operation interruption time is more than 1 minute and less than 10 minutes, the blower output is maximized to clean the membrane. That is, under state that the operation of the recycle pump is stopped and about one minute has lapsed, if the recycle pump continues to be stopped, the output of the blower is maximized to clean the membrane. When the recycle is again started at about 10 minutes after the operation of the recycle pump is stopped, the blower is again operated to lower the dissolved oxygen (DO) to an optimum level so that the increased dissolved oxygen (DO) is not flown in the anoxic/anaerobic alternating-type reactor.

Next, the sludge waste amount control (Step 4) is described. The sludge waste is required to properly maintain the microbe concentration and the SRT in the reactor. A long SRT is required for the nitrification and a short SRT is required for removal of phosphorous. The microbe waste is continuously carried out so that microbes having a long SRT and microbes having a short SRT can coexist. The sludge waste amount is determined by a following equation 1.

$$FR = \frac{\left(S_{anoxic/anaerobic\ alternating\text{-}type\ reactor} \times V_{anoxic/anaerobic\ alternating\text{-}type\ reactor}\right) + (S_{aerobic\ reactor} \times V_{aerobic\ reactor})}{S_{aerobic\ reactor} \times SRT_d} \quad \text{?equation 1?}$$

Herein, FR represents sludge waste amount (m$^3$/day), $S_{anoxic/anaerobic\ alternating\text{-}type\ reactor}$ represents sludge concentration in the anoxic/anaerobic alternating-type reactor (kg/m$^3$), $S_{aerobic\ reactor}$ represents sludge concentration in the aerobic reactor (kg/m$^3$), $V_{anoxic/anaerobic\ alternating\text{-}type\ reactor}$ represents a volume of the anoxic/anaerobic alternating-type reactor (m$^3$), $V_{aerobic\ reactor}$ represents a volume of the aerobic reactor (m$^3$), and $SRT_d$ represents a set average SRT (Solids Retention Time)(day).

When determining the sludge waste flow rate, for the nitrification and phosphorous removal, it is preferred to determine the waste amount so that the average SRT, i.e., $SRT_d$ of the above equation 1 is 40 to 60 days.

As described above, according to the invention, the internal recycle pump is intermittently operated to alternately repeat the anoxic/anaerobic processes, so that the nitrogen is removed with the denitrification reaction under anoxic condition and the phosphorous is released under anaerobic condition. Accordingly, it is possible to efficiently treat the nitrogen and phosphorus in the sewage, wastewater, etc. at the same time. In particular, even in the case of the sewage having a low C/N ratio, the limited carbon source contained in the sewage is effectively distributed and used for the denitrification and phosphorous removal, so that it is possible to maintain the removal efficiencies of nitrogen and phosphorus to be high at the same time.

In addition, since the perfect solid-liquid separation is made through the submerged-type separation membrane, highly clean water quality is maintained, so that the treated water can be readily reused as heavy water without an additional separate processing operation. Further, since the inflow water is continuously flown in and the treated water is continuously produced through the membrane filtering process in the aerobic reactor at the same time, a total treatment amount of water can be maintained to be high. Also, since the number of the reactors and the pumps required is decreased, a configuration of all procedures is made to be simple and a continuous processing operation is made to be possible, which means improvement in an economic point of view.

Further, according to the invention, since a recycle rate, a recycle time for alternately operating anoxic and anaerobic processes, a sludge waste amount, an aeration amount and an operation of a blower for an intermittent membrane cleaning are measured and controlled, the operation and the maintenance of the apparatus are easy and the overall treating efficiency and capacity can be maximized, and improvement in economic point of view can be obtained due to the reduced operating costs. In particular, when the recycle flow rate is controlled according to the inflow rates, it is possible to maintain the concentration of nitrate nitrogen in the outflow to be optimum and to regulate the sludge waste amount so as to maintain the optimum SRT. Accordingly, it is possible to smoothly carry out the removal of nitrogen and phosphorous. In addition, since the anoxic/anaerobic reactions are regulated according to the internal conditions of the anoxic/anaerobic alternating-type reactor through the automatic measurement and control, it is possible to reduce the concentrations of nitrogen and phosphorous in the treated water by efficiently distributing and using the organics in the inflow water. Further, when the automatic measurement and control is carried out, an operation can be performed without a need that an operator should arbitrarily regulate the reaction time according to the change of properties and concentrations of the inflow water. Also, it is possible to reduce the operating costs of the blower, which is generally known as occupying 70% of the operating costs of the advanced treatment method, through control of the dissolved oxygen (DO) in-the aerobic reactor.

Many alterations and modifications may be made by those having ordinary skill in the art without departing from the spirit and scope of the invention. Therefore, it must be understood that the embodiment and example described above should not be taken as limiting the invention as defined by the following claims. The claims are thus to be understood to include what is specifically described above, what is conceptionally equivalent, what can be obviously substituted and also what essentially incorporates the essential idea of the invention.

What is claimed is:

1. A membrane coupled activated sludge method operating anoxic/anaerobic processes alternately for removal of nitrogen and phosphorous being a method for advanced treating of a sewage or wastewater or filthy water simultaneously treating nitrogen and phosphorous wherein an anoxic process, in which a denitrification reaction for removing nitrogen occurs, and an anaerobic process for discharging phosphorous are alternately carried out, the anoxic process comprising:
(a) continuously flowing sewage or waste water or filthy water as an inflow water into an anoxic/anaerobic alternating-type reactor;
(b) operating an internal recycle pump intermittently to internally recycle nitrate nitrogen occurring in an aerobic reactor continuously and thus to make the anoxic/anaerobic alternating-type reactor into anoxic condition;
(c) converting and removing the nitrate nitrogen supplied through the internal recycle of (b) into nitrogen gas by using organics in the continuous inflow water as carbon source;
(d) overflowing and moving the mixed solution denitrified in (c) into a continued aerobic reactor;
(e) carrying out a nitrification process of converting organic nitrogen and ammonia nitrogen, which are supplied from the inflow water, into nitrate nitrogen with nitrification microbes and an organic oxidation process of decomposing remaining organics, under aerobic condition of the aerobic reactor in which continuous aeration is made by a blower; and
(f) continuously discharging treated water by using a submerged-type separation membrane equipped in the aerobic reactor;

the anaerobic process comprising:
(a') continuously flowing sewage or waste water or filthy water as an inflow water into the anoxic/anaerobic alternating-type reactor;
(b') stopping the internal recycle pump, which is intermittently operated, to discontinue the internal recycle of the nitrate nitrogen occurring in the aerobic reactor and thus to make the anoxic/anaerobic alternating-type reactor into anaerobic condition;
(c') inducing phosphorous release with microbes for removing phosphorous by using organics of the continuous inflow water as carbon source, under anaerobic state that the nitrate nitrogen is denitrified and depleted due to the interruption of the internal recycle in (b');
(d') overflowing and moving the microbes having released the phosphorous in (c') into the continued aerobic reactor;
(e') lowering a concentration of dissolved phosphorous in the aerobic reactor through an excess phosphorous uptake of the phosphorous releasing microbes in (d') and simultaneously carrying out the nitrification process of converting organic nitrogen and ammonia nitrogen, which are supplied from the inflow water, into nitrate nitrogen by nitrification microbes and the organic oxidation process of decomposing remaining organics, under aerobic condition of the aerobic reactor in which continuous aeration is made by the blower;
(f') continuously discharging treated water of which phosphorous is removed by using the submerged-type separation membrane equipped in the aerobic reactor; and
(g') wasting sludge, in which phosphorous is excessively uptook in (e'), to discharge the phosphorous; and wherein the anoxic and anaerobic processes in the anoxic/anaerobic alternating-type reactor are distinguished according to whether the internal recycle of the nitrate nitrogen by means of the internal recycle pump is performed, wherein the method further comprises:
(S1) performing a recycle rate control for maintaining a ratio of an internal recycle flow rate of the nitrate nitrogen to an inflow rate of the inflow water to be constant;
(S2) performing a recycle time control for continuously measuring an oxidation-reduction potential (ORP) in the anoxic/anaerobic alternating-type reactor and determining whether the internal recycle pump is operated or not, based on the measured value;
(S3) performing a blower control for continuously measuring dissolved oxygen (DO) in the aerobic reactor if the internal recycle pump is operated and regulating a rotating speed of the blower so as to maintain the dissolved oxygen (DO) value to be a predetermined level; and
(S4) performing a sludge waste amount control for determining a sludge waste amount according to the following equation and wasting the sludge, $$FR = \frac{\left(S_{anoxic/anaerobic\ alternating\text{-}type\ reactor} \times V_{anoxic/anaerobic\ alternating\text{-}type\ reactor}\right) + (S_{aerobic\ reactor} \times V_{aerobic\ reactor})}{S_{aerobic\ reactor} \times SRT_d}$$

wherein, FR represents sludge waste amount (m$^3$/day), $S_{anoxic/anaerobic\ alternating\text{-}type\ reactor}$ represents sludge concentration in the anoxic/anaerobic alternating-type reactor (kg/m$^3$), $S_{aerobic\ reactor}$ represents sludge concentration in the aerobic reactor (kg/m$^3$), $V_{anoxic/anaerobic\ alternating\text{-}type\ reactor}$ represents a volume of the anoxic/anaerobic alternating-type reactor (m$^3$), $V_{aerobic\ reactor}$ represents a volume of the aerobic reactor (m$^3$), and $SRT_d$ represents a set average SRT (Solids Retention Time)(day).

2. The method according to claim 1, wherein, in the step S1, the ratio of an internal recycle flow rate of the nitrate nitrogen to an inflow rate of the inflow water is controlled through a proportional controller.

3. The method according to claim 1, wherein, in the step S2, under state that the internal recycle pump is being operated, the oxidation-reduction potential (ORP) value in the anoxic/anaerobic alternating-type reactor is continuously measured to operate the internal recycle pump continuously when the oxidation-reduction potential (ORP) value is −100 mV or less and to stop the operation of the internal recycle pump when the oxidation-reduction potential (ORP) value is more than −100 mV, and under state that the internal recycle pump is not operated, the oxidation-reduction potential (ORP) value in the anoxic/anaerobic alternating-type reactor is continuously measured to operate the internal recycle pump when the oxidation-reduction potential (ORP) value is less than −400 mV.

4. The method according to claim 1, wherein, in the step S3, when the internal recycle pump is not operated, the rotating speed of the blower is maximized to clean the membrane for a predetermined time.

5. The method according to claim 1, wherein, in the step S3, under state that the internal recycle pump is operated, the rotating speed of the blower is regulated so that the dissolved oxygen (DO) in the aerobic reactor is not to be less than 2.0 mg/l, and under state that the internal recycle pump is not operated, the operation interruption time of the internal recycle pump is measured and then the rotating speed of the blower is maximized to clean the membrane when the operation interruption time is more than 1 minute and less than 10 minutes.

6. The method according to claim 1, wherein, in the step S4, the $SRT_d$ of the equation is set to be 20 days when determining the sludge waste amount.

7. A membrane coupled activated sludge apparatus operating anoxic/anaerobic processes alternately for removal of nitrogen and phosphorous being an apparatus for advanced treating of a sewage or wastewater or filthy water simultaneous treating nitrogen and phosphorous, wherein an anoxic process, in which a denitrification reaction for removing nitrogen occurs, and an anaerobic process for discharging phosphorous are alternately carried out, the apparatus comprising:

an anoxic/anaerobic alternating-type reactor having an agitator and into which inflow water of sewage or filthy water or wastewater is continuously flown;

an aerobic reactor having a blower and allowing an organic oxidation reaction, a nitrification reaction and an excessive uptake of phosphorous to occur under an aerobic condition;

an internal recycle pump recycling nitrate nitrogen occurring from the aerobic reactor to the anoxic/anaerobic alternating-type reactor; and a submerged-type separation membrane equipped in the aerobic reactor and discharging treated water continuously through membrane filtration, wherein the anoxic and anaerobic processes in the anoxic/anaerobic alternating-type reactor are distinguished according to whether the internal recycle of the nitrate nitrogen by means of the internal recycle pump is performed, wherein the apparatus further comprises:

an oxidation-reduction potential (ORP) measuring sensor for measuring an oxidation-reduction potential (ORP) in the anoxic/anaerobic alternating-type reactor;

a dissolved oxygen (DO) measuring sensor for measuring a dissolved oxygen (DO) in the aerobic reactor;

an inflow flowmeter for measuring and controlling a flow rate of the inflow water;

a recycle flowmeter for measuring and controlling an internal recycle flow rate;

a surplus sludge flowmeter for measuring and controlling an amount of waste sludge discharged from the aerobic reactor; and a processor for controlling the internal recycle pump, the blower and each of the flowmeters, corresponding to the information of the measured values inputted from the sensors and flowmeters, wherein the processor performs a recycle rate control, a recycle time control, a blower control and a sludge waster amount control, the recycle rate control comprising maintaining a ratio of an internal recycle flow rate of the nitrate nitrogen to an inflow rate of the inflow water to be constant;

the recycle time control comprising continuously measuring an oxidation-reduction potential (ORP) in the anoxic/anaerobic alternating-type reactor and determining whether the internal recycle pump is operated or not, based on the measured value;

the blower control comprising continuously measuring dissolved oxygen (DO) in the aerobic reactor if the internal recycle pump is operated and regulating a rotating speed of the blower so as to maintain the dissolved oxygen (DO) value to be a predetermined level; and the sludge waste amount control comprising determining a sludge waste amount according to a following equation and wasting the sludge, $$FR = \frac{\left( \begin{array}{c} S_{anoxic/anaerobic\ alternating-type\ reactor} \times \\ V_{anoxic/anaerobic\ alternating-type\ reactor} \end{array} \right) + (S_{aerobic\ reactor} \times V_{aerobic\ reactor})}{(S_{aerobic\ reactor} \times SRT_d)}$$

wherein, FR represents sludge waste amount (m³/day), $S_{anoxic/anaerobic\ alternating-type\ reactor}$ represents sludge concentration in the anoxic/anaerobic alternating-type reactor (kg/m³), $S_{aerobic\ reactor}$ represents sludge concentration in the aerobic reactor (kg/m³), $V_{aerobic/anaerobic\ alternating-type\ reactor}$ represents a volume of the anoxic/anaerobic alternating-type reactor (m³), $V_{aerobic\ reactor}$ represents a volume of the aerobic reactor (m³), and $SRT_d$ represents a set average SRT (Solids Retention Time)(day).

8. The apparatus according to claim 7, wherein the processor comprises a digital input/output computer and an analog/digital (A/D) converter converting a digital signal outputted into an analog signal for outputting the analog signal and converting the analog signal inputted into a digital signal for inputting the digital signal.

* * * * *